United States Patent [19]

Hammer et al.

[11] 4,017,557

[45] * Apr. 12, 1977

[54] NOVEL ELASTOMERIC GRAFT COPOLYMERS

[75] Inventors: Clarence Frederick Hammer, Wilmington, Del.; Harold King Sinclair, Louisville, Ky.

[73] Assignee: E. I. Du Pont de Nemours and Company, Wilmington, Del.

[ * ] Notice: The portion of the term of this patent subsequent to Aug. 3, 1993, has been disclaimed.

[22] Filed: Nov. 13, 1974

[21] Appl. No.: 523,465

[52] U.S. Cl. .................. 260/857 G; 260/857 L; 260/857 D
[51] Int. Cl.² ........................................ C08L 77/00
[58] Field of Search .................... 260/857 G, 857 L

[56] References Cited

UNITED STATES PATENTS

| | | | |
|---|---|---|---|
| 2,524,045 | 10/1950 | Flory | 260/857 G |
| 3,136,738 | 6/1964 | Hedrick | 260/857 G |
| 3,243,476 | 3/1966 | Black | 260/857 G |
| 3,325,561 | 6/1967 | Grillo | 260/857 G |
| 3,337,648 | 8/1967 | Aelion | 260/857 G |
| 3,388,186 | 6/1968 | Kray | 260/857 G |
| 3,465,059 | 9/1969 | Seven | 260/857 G |
| 3,539,664 | 11/1970 | Kray | 260/857 L |
| 3,634,543 | 1/1972 | Sherman | 260/857 L |
| 3,644,571 | 2/1972 | Anderson | 260/857 L |
| 3,676,400 | 7/1972 | Kohan | 260/857 L |

*Primary Examiner*—Murray Tillman
*Assistant Examiner*—W. C. Danison, Jr.

[57] ABSTRACT

6-Nylons and 12-nylons having primary amino endgroups and an average degree of polymerization of about 5-60 are grafted onto elastomeric trunk polymers having anhydride groups, vicinal carboxylic groups, or carboxylic groups adjacent to alkoxycarbonyl groups by heating a mixture of the nylon and the trunk polymer, preferably under high shear conditions for about 1 minute or less to 30 minutes or more above the melting temperature of the nylon. The resulting elastomeric graft polymers are suitable for fabricating into a variety of articles, such as, for example, wire jacketing, hose, belts, seals, gaskets, and low pressure tires.

15 Claims, No Drawings

NOVEL ELASTOMERIC GRAFT COPOLYMERS

BACKGROUND OF THE INVENTION

This invention relates to novel thermoplastic, elastomeric polymeric materials formed by grafting short chain 6-nylons or 12-nylons onto rubbery trunk polymers.

Most elastomers can be molded or extruded into various shapes. The fabricated articles may include, for example, automotive trim, bumper inserts, and hoses. Usually, these elastomers have low strength and must be crosslinked after being shaped into the desired article. The curing step usually requires compounding with suitable agents such as sulfur, peroxides, and the like, before shaping. The thermal sensitivity of the compounded curable compositions may cause premature curing ("scorch") and loss of plasticity. Radiation cures, which do not involve compounding, are generally only effective with thin cross sections; degradation may compete with crosslinking. Furthermore, cured scrap and cured shaped articles which have defects are not conveniently reused. Accordingly, it would be desirable to have thermoplastic elastomers which require no cure and can be shaped repeatedly by heating to give articles having satisfactory strength and dimensional stability at the temperatures prevailing during their use. Blends and grafts of polymers are known in the art to give thermoplastic products which often have improved properties.

Tutorskii et al., Journal Polymer Sc. 61, 97–106 (1962) reports grafting of $\epsilon$-caprolactam onto carboxylated butadiene-styrene rubbers by heating the rubber and the lactam above 200° C. in the presence of boron trifluoride.

Chapman et al., Journal Polymer Sc. 34, 319–335 (1959) report the polymerization of $\epsilon$-caprolactam at elevated temperatures in the presence of a copolymer of styrene with methyl acrylate, acrylic acid, or maleic anhydride. Gelling was observed in several instances, especially with styrene/maleic anhydride copolymers.

U.S. Pat. No. 3,484,403 describes certain hot melt adhesive and coating compositions based on blends of polyamides with grafts of unsaturated dicarboxylic acids or their anhydrides on polyolefin backbone.

U.S. Pat. No. 3,261,885 discloses block-graft copolymers obtained by subjecting to high shear conditions at 50°–350° C. a mixture of $C_2$–$C_4$ olefin or styrene copolymers with up to 50 weight percent of another unsaturated monomer with various synthetic linear polyamides in the presence of free radical generators.

Yurkevich et al., Khimicheskie Volokna No. 3, 11–13 (1971) (1972, Consultants Bureau's English translation) reports experiments with graft copolymers of polycaproamide (6-nylon) with vinyl monomers, such as acrylonitrile, styrene, acrylic acid, and various acrylic esters. While no experimental details are given, it appears that the vinyl monomers were grafted onto polycaproamide. The resulting products were examined for possible use in melt spinning of fibers.

U.S. Pat. No. 3,676,400 discloses melt extrusion of mixtures of certain amino-terminated polyamides having molecular weights of at least 2000, and preferably 10,000 – 40,000, with copolymers of 2-monoolefins and unsaturated mono- or dicarboxylic acids.

None of the prior art suggests grafting of amino-terminated 6- or 12-nylons on rubbery materials to produce thermoplastic elastomers of improved mechanical properties.

SUMMARY OF THE INVENTION

According to this invention, there is provided a class of novel thermoplastic, elastomeric compositions, which are made by grafting short chain primary amino-terminated 6-nylons or 12-nylons onto uncured elastomeric trunk polymers having reactive sites such as anhydride, adjacent carboxyl and alkoxy carbonyl, or two adjacent carboxy groups. These graft copolymers can be readily shaped and molded at temperatures above the melting point of the nylon component; when cooled to temperatures below 100° C., they display greatly enhanced strength relative to that of cured trunk polymers.

For the purpose of the present invention, the term "6-nylon" means an $NH_2$-terminated linear polymer of $\epsilon$-caprolactam. The term "12-nylon" means an $NH_2$-terminated linear polymer of $\omega$-laurolactam. Suitable short chain 6- or 12-nylons have an average degree of polymerization of about 5–60 and contain no primary or secondary amino groups other than one terminal $NH_2$ group.

In the resulting graft copolymers of the present invention the polyamide branches are believed to be attached to the trunk through imide or amide linkages. An imide can be represented, for example, by the following Formula (1)

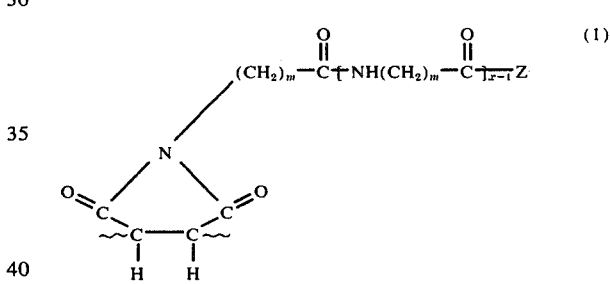

wherein
the wavy lines represent the trunk copolymer;
Z is

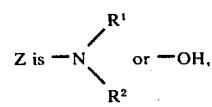

or —OH,
$R^1$ and $R^2$ being independently selected from hydrogen, a $C_1$–$C_{18}$ alkyl, benzyl, and a $C_5$–$C_6$ cycloalkyl; or, taken together, being —$(CH_2)_4$—, —$(CH_2)_5$—, —$(CH_2)_2$—O—$(CH_2)_2$—, or

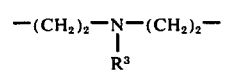

where $R^3$ is a $C_1$–$C_6$ alkyl; with the proviso that only one of $R^1$ and $R^2$ can be hydrogen;
$m$ is 5 or 11; and
$x$ is a positive number having an average value of about 5–60.

In addition to or instead of the imide groups, such as shown in Formula (1), amide linkages may be present in the graft copolymer. The amide linkages may form as intermediates in the first stage of the grafting process or may be the predominant groups if grafting is stopped at that stage.

DESCRIPTION OF THE INVENTION

The trunk polymers useful in the present invention are elastomeric. As applied to the trunk polymers, the term "elastomeric" is defined to mean that when they are crosslinked, they are capable of recovering from large deformations quickly and forcibly. Free from diluents, the crosslinked trunk polymers retract within one minute to less than 1.5 times their original lengths after being stretched at 18°–29° C. to twice their lengths and held for one minute before release. However, these trunk polymers are used in the process of this invention in uncured state. The graft copolymers of this invention are elastomeric, as defined above for the trunk copolymers, without being subjected to vulcanization or curing. Grafting of polyamide side chains on an uncured trunk polymer results in an elastomeric graft copolymer.

The uncured trunk polymers may carry additional functional groups such as, for example, carboxyl, alkoxycarbonyl, alkoxyl, and cyano. Hydroxyl or amino groups, however, are unsuitable because they can interact with the graft sites to form thermostable crosslinks causing a loss of the desired thermoplasticity. The trunk copolymers contain, on a number-average basis, about 300 to 50,000 (preferably 1,000 to 5,000) chain atoms and about one to 50 amine-reactive sites per 1000 chain atoms of the trunk copolymer. The side-chain polymer will, in general, be shorter than the trunk copolymer, ranging in length from about 25 to 1,000 chain atoms, preferably about 30 to 300 chain atoms. The trunk polymers must be sufficiently stable to withstand heating during the grafting step and the subsequent processing into shaped articles. Such polymers usually are copolymers of the active site-containing monomer with at least one other monomer, for example, various α-olefins such as ethylene, propylene, 1-butene; dienes such as butadiene, isoprene, 1,3-hexadiene, 1,4-hexadiene, and norbornadiene; styrene, and its ring-substituted derivatives; acrylic and methacrylic acids, esters and nitriles; vinyl esters such as vinyl acetate and butyrate; vinyl ethers, vinyl sulfides, and the like. Representative trunk copolymers can be made by copolymerizing the site-containing monomer with such other monomers as, for example, ethylene and an alkyl acrylate; ethyl or butyl acrylate; ethylene and vinyl acetate; ethylene and acrylonitrile; and ethylene and methyl vinyl ether.

The amine-reactive sites on the trunk copolymers are provided by monomers which are either copolymerized during the preparation of the trunk copolymer or are grafted onto a previously existing polymer.

Copolymerization of the monomer providing the amine-reactive site will be possible when all the monomers are polymerizable by conventional free radical catalysis. Ethylene, alkyl acrylates, conjugated dienes, styrene, vinyl ether, vinyl sulfides, acrylonitrile, vinyl esters, acrylic acid, methacrylic acid, and the like, are examples of such comonomers.

Free radical-polymerizable monomers, which can be incorporated into the trunk copolymer to provide the amine-reactive sites, frequently have the formulae

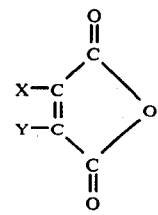

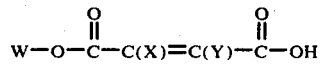

where X and Y are independently selected from H, Cl, $C_1$–$C_8$ alkyl, and phenyl; with the proviso that one of X and Y must be H; and W is H, $C_1$–$C_{10}$ alkyl, phenyl, naphthyl, or substituted phenyl or naphthyl where the substituents are $C_1$–$C_{10}$ alkyl, halogen, or $C_1$–$C_{10}$ alkoxy groups. Other possible monomers, which are not represented by either formula (2) or formula (3), are itaconic acid, its anhydride, and monoesters.

Compounds representative of formula (2) include maleic anhydride and citraconic anhydride. Compounds representative of formula (3) include maleic acid, citraconic acid, fumaric acid, mesaconic acid, and monoesters of maleic and fumaric acids, including the methyl, ethyl, isopropyl, propyl, butyl, tert-butyl, amyl, isoamyl, hexyl, octyl, decyl, phenyl, 1-naphthyl, 2-naphthyl, 2-methylphenyl, 2-ethylphenyl, 2,5-dimethylphenyl, 4-isopropylphenyl, 4-butylphenyl, 3,5-dimethyl-3-propylphenyl, 3-decylphenyl, 4-tetradecylphenyl, 4-hexadecylphenyl, 4-octadecylphenyl, 2-chlorophenyl, 4-methoxyphenyl, 4-bromophenyl, 2-chloro-1-naphthyl, 4-chloro-1-naphthyl, 6-chloro-1-naphthyl, 7,8-dichloro-1-naphthyl, 4-bromo-1-naphthyl, 7-chloro-2-naphthyl, 4-methyl-1-naphthyl, and 1-propyl-2-naphthyl esters.

Suitable free-radical polymerization initiators include organic peroxides, for example, lauryl peroxide, and di-t-butyl peroxide; peresters, such as t-butyl peracetate and t-butyl peroxypivalate; and azo compounds, such as azobisisobutyronitrile. The copolymerization is carried out most advantageously in a pressure reactor at a temperature of 90°–250° C. and a pressure of 1600–2200 atm. The polymerization temperature is preferably maintained at about 145° C. and the pressure at 1800–2000 atm. Usually, the polymerization process is continuous, the monomer, optionally a solvent such as benzene, and the initiator being introduced at a controlled rate, and the reaction product being continuously removed. A stirred autoclave such as described in U.S. Pat. No. 2,897,183 to Christl et al. can be used.

A representative trunk copolymer is a random copolymer of ethylene, methyl acrylate, and from 0.0025 to 0.077 moles/100 grams of polymer of a monoethyl maleate, each 100 grams of copolymer having about 0.64–0.80 moles of (—$CO_2$—) units. Such copolymers may have, for example, compositions such as the following:

| | Mole % | |
|---|---|---|
| Ethylene | Methyl Acrylate | Monoethyl Maleate |
| 71.2 | 28.7 | 0.1 |
| 57.8 | 42.1 | 0.1 |
| 74.4 | 22.0 | 3.6 |
| 61.4 | 34.4 | 4.2 |

Another representative trunk copolymer is an alternating copolymer having repeating units consisting essentially of —A—B—, where B represents ethylene units and A represents units selected from at least one $C_1$–$C_8$ alkyl acrylate, and an acrylic cure-site monomer (2) or (3) (described above). The copolymerization is done in solution at −10° to about 200° C. in the presence of a free radical initiator and $BF_3$ at pressures sufficient to keep the $BF_3$ complexed with the alkyl acrylate (generally 10 psig to 10,000 psig).

Conventional ethylene/α-olefin/diene monomer (EODM) copolymers, and especially EPDM (ethylene/propylene/diene monomer) copolymers, also can be used as the trunk polymers, provided an active site is introduced therein. These copolymers are prepared in the presence of Ziegler (or coordination) catalysts, which are combinations of transition metal compounds (usually vanadium or titanium compounds such as $VOCl_3$, $VCl_4$, vanadium trisacetylacetonate, and titanium tetrachloride) and Group I-III organometallic reducing agents (such as alkylaluminum chlorides and bromides, lithium aluminum tetraalkyls, aluminum trialkyls). EPDM rubber is made by copolymerizing ethylene and propylene with at least one nonconjugated hydrocarbon diene (such as, for example, 1,4-hexadiene, 5-propenyl-2-norbornene, 5-ethylidene-2-norbornene, 5-methylene-2-norbornene, or dicyclopentadiene) as described in U.S. Pat. Nos. 2,933,480 to Gresham & Hunt; 3,000,866 to Tarney; 3,093,620 to Gladding; 3,093,621 to Gladding et al.; 3,211,709 to Adamek et al.; and 3,151,173 to Nyce. One of the double bonds is usually substantially less reactive than the other; incorporation of the diene then leads to a monomer unit having the less reactive double bond in the side-chain. After the copolymer has been formed, active site monomers (2) or (3) (described above) can be grafted to the EPDM by thermal addition to the unsaturated side-chains. A typical trunk copolymer can be represented by the following formula (4), which illustrates the case of a graft of maleic anhydride on an ethylene/α-olefin/1,4-hexadiene copolymer. Wavy lines represent the polymer chain.

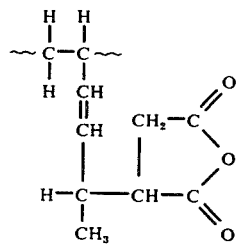
(4)

The hydrocarbon copolymer may also include small amounts of units of a direactive nonconjugated diene as in the ethylene/propylene/1,4-hexadiene/2,5-norbornadiene copolymer (and others) described in U.S. Pat. No. 3,819,591 to Campbell and Thurn.

Propylene is normally selected as the α-monoolefin in preparing side-chain unsaturated elastomeric ethylene copolymers because of its availability and low cost. Higher α-monoolefins ($C_4$–$C_{18}$) also are useful; 1-butene, -hexene, and 1-dodecene are examples.

The graft addition of amine-reactive monomers described above (e.g., maleic anhydride and ethyl hydrogen maleate) is conveniently accomplished by heating a blend of the copolymer and amine-reactive monomer within a range of about 225°–400° C. A process of this type is described in detail in the copending application of Stanley William Caywood, Jr., Ser. No. 322,360, filed Jan. 10, 1973, and now allowed in part. Internal mixers or extruders are suitable. Exposure to maleic anhydride vapor should be minimized on account of its toxicity and potential for causing severe eye damage. Unchanged maleic anhydride can be extracted from the graft product with water or separated by dissolving the product in hexane (which will not solubilize maleic anhydride).

The proportion of the active sites in the trunk polymer can vary within a broad range. It is closely related to the desired proportion of the 6- or 12-nylon in the final graft copolymer. For any given proportion of nylon grafts, there must be available a sufficient number of graft sites. The required number of graft sites also is related to the degree of polymerization of the starting 6- or 12-nylon. To achieve the same final proportion of grafted nylon, one may choose a trunk polymer having fewer graft sites and a 6- or 12-nylon having a relatively high degree of polymerization (for example, 45) or a trunk polymer having more graft sites and a 6- or 12-nylon having a relatively low degree of polymerization (for example, 7). These relationships are very straightforward and can be readily established by a skilled chemist or chemical engineer.

Many elastomeric polymers could be used in principle as the trunk polymers, but some polymers are not attractive because they may undergo undesirable side reactions. Halogenated polymers, for example, have a tendency to thermally dehydrohalogenate. Chlorosulfonyl groups are suitable grafting sites, but chlorosulfonated polyethylene is not a good trunk polymer because it does not have sufficient thermal stability. It is worth mentioning that isolated acid groups, such as carboxylic groups, may form quasi salt-like addition products with amino-terminated 6-nylons. Such products do not by themselves, however, have sufficient thermal stability unless grafts also are present. Under the usual grafting conditions, no appreciable amide formation would occur between such carboxylic groups and the nylons.

The amino-terminated 6- or 12-nylons are prepared by thermal polymerization of ε-caprolactam or ω-laurolactam initiated by water or by amines of the formula $R_1R_2NH$, where $R_1$ and $R_2$ have the meaning defined above in Summary of the Invention. Representative amines include butylamine, hexylamine, octylamine, diethylamine, dibutylamine, cyclopentylamine, cyclohexylamine, propylamine, morpholine, pyrrolidine, N-methylpiperazine, and piperidine. The molar ratio range of the lactam to the amine initiator normally will be slightly broader than the desired range of degree of polymerization and can be about 4:1 to 65:1. It is recommended that at least about 2 weight percent of water be present for practical reaction rates; 5% is satisfactory. About three hours at 245° C. are satisfactory, but the reaction time is rather long; higher temperatures, such as 280° C., allow a shorter reaction time.

When it is desired to prepare a carboxyl-terminated nylon, the polymerization is initiated by water alone and is carried out in the presence of a large amount of water, usually, about 20–50 weight percent of the starting lactam. The resulting 6- or 12-nylon has the structure

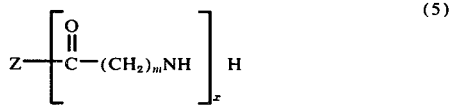

$$Z \!-\!\!\left[\!-\!\overset{\overset{\displaystyle O}{\|}}{C}\!-\!(CH_2)_m NH\!-\!\right]_x\!\! H \tag{5}$$

wherein Z is —OH and $m$ and $x$ have the above-defined meaning.

The degree of polymerization of the nylon (5) can be determined by titration of the terminal amino groups by well known methods. It is often practical to carry out the titration in an alcoholic solution by either the potentiometric or the conductometric method.

It is believed that under the grafting conditions the nylon reacts with the anhydride group at the graft site, either initially present or formed under graft conditions, to form the cyclic imide such as that of Formula (1), above. In the preferred embodiment of the process, the anhydride group is already present in the trunk polymer. The next preferred is an adjacent pair of a carboxylic group and an alkoxycarbonyl, which at higher temperature form the anhydride, with elimination of one molecule of alcohol. A third alternative is to use a starting trunk polymer preferably having vicinal carboxylic groups (although 1,3-carboxylic groups allow some grafting).

When the graft site is an adjacent pair of a carboxylic group and an alkoxycarbonyl, these groups normally are derived from a monoalkyl maleate, fumarate, or citraconate comonomer. Vicinal carboxyl groups are introduced by copolymerization with fumaric, maleic, itaconic, or citraconic acids. The size of the ester alkyl group is at most about 20 carbon atoms. Preferred are ethyl and methyl esters. Other esters include, for example, all isomeric forms of propyl, butyl, hexyl, nonyl, undecyl, tetradecyl, heptadecyl, and eicosyl.

Grafting can be accomplished in any convenient apparatus, preferably one able to produce high shear conditions at a temperature above the melting point of the starting nylon. Examples include roll mills, extruders, and internal mixers having convoluted rollers, sigma blades, and the like. Usually, the reaction temperature will be at least about 215° C. The reaction time mainly depends on the speed of mixing because the grafting reaction is quite rapid. The usual reaction time will be about 1–30 minutes. Below 1 minute, adequate mixing may not be achieved in some equipment; however, reaction times as short as, for example, 15 seconds are possible. Above 30 minutes, no additional grafting can be expected, while some thermal degradation may occur. In any event, it is practical to avoid air atmosphere during the grafting operation, for example, by maintaining a nitrogen blanket over the reacting mass or by carrying out the process in an extruder.

The ratio of the 6- or 12-nylon to the trunk polymer can be varied within a rather broad range. Since it is desired to produce elastomeric products, rather than plastics, the minimum proportion of the elastomeric trunk polymer should be about 45 weight percent of the final product. Above about 85 weight percent of the trunk polymer, the mechanical properties of the graft copolymer tend to deteriorate.

Graft copolymers having the most desirable balance of physical properties are those in which the proportion of the 6-nylon is about 35–55 parts per 100 parts by weight of the trunk copolymer, the latter thus constituting about 64.5–74 weight percent of the final graft copolymer. Graft copolymers having the highest tensile strength contain about 50–90 parts of the 6-nylon per 100 parts by weight of the trunk copolymer, the latter constituting about 52.5–67 weight percent of the final graft copolymer.

It is theoretically possible to graft amine-terminated 6-nylon onto an elastomeric backbone polymer in solution, but solvents which would dissolve nylon (mainly, phenolic solvents) are rather inconvenient to work with. Therefore, solution grafting is less attractive.

The progress of grafting can be followed by infrared spectroscopy. When the starting trunk polymer contains 5-membered, cyclic anhydride active sites, the disappearance of either one of two characteristic absorption bands at 5.4 microns or at 5.6 microns indicates that grafting is taking place. The proportion of the anhydride groups in the starting trunk polymer can be determined by forming a polymer film of known thickness and examining the infrared spectrum of such film. It has been found experimentally that 0.28 absorption units/mil (11 units/mm) at 5.4 microns or 2.2 absorption units/mil (87 units/mm) at 5.6 microns correspond to 10 weight percent anhydride. The absorption units are read directly from an infrared spectrogram.

Similarly, when the starting trunk copolymer contains vicinal carboxyl and alkoxycarbonyl groups, the characteristic infrared absorption band lies at 5.9 microns. Assuming the vicinal carboxyl and alkoxycarbonyl groups to be derived from ethyl hydrogen maleate, the characteristic absorption will be 1.1 absorption units/mil (43 units/mm) for every 10 weight percent maleate present. Such analytical techniques would not be practical in the case of a starting copolymer containing vicinal carboxyl groups. However, the concentration of carboxyl groups can be readily determined by simple titration.

The graft copolymer product can be characterized by several techniques, which show the presence of polyamide side chains, the degree of polymerization of the polyamide side chains, and the chemical identity of the polyamide, to name a few. Certain physical characteristics often are also helpful to show that a graft copolymer has been obtained.

The presence of polyamide is shown by infrared absorption at 6.0 microns (amide carbonyl). Other useful wavelengths include 6.4 microns (—NH bending) and 3.0 microns (—NH stretching). The proportion of polyamide is determined by Kjeldahl analysis for % N.

The polyamide can be chemically identified by heating a sample of a graft copolymer with a mineral acid, for example, sulfuric or hydrochloric acids, to about 200° C. or more. Under these conditions, the polyamide chain degrades to the starting lactam. Both $\epsilon$-caprolactam and $\omega$-laurolactam are volatile. They can be isolated and identified by any convenient technique of qualitative analysis.

Direct measurement of graft efficiency by extraction of unbound polyamide is difficult since solvents for polyamides also attack trunk and graft copolymers. Reactive function titration results on graft copolymers provide no more than rough estimates of graft efficiency.

Determination of the increase of molecular weight due to grafting is a convenient technique. This is usually done by gel permeation chromatography of 0.5% graft copolymer solutions in m-cresol at 100° C. on porous polystyrene-packed columns.

A good indication that grafting has taken place is the torsion modulus of the products, especially at 100°–150° C. While the grafted copolymer will have a fairly high modulus (e.g., $10^7$–$10^8$ dynes/cm.$^2$), ungrafted material will flow in that temperature range.

Ungrafted blends of trunk copolymers and polyamides (within the proportions capable of giving elastomeric graft copolymers) display negligible strengths and compression set resistance, acting like typical uncured compositions. After grafting, the strength, clarity, hardness, compression set resistance, and solvent resistance increase. Strength at elevated temperatures, e.g., at 100° C., is significantly better than displayed by the physical blends before grafting.

Knowing the degree of polymerization (DP) of each starting 6- or 12-nylon, it is possible to plot DP versus the peak melting point of each resulting graft copolymer, as determined with a differential scanning calorimeter (DSC). It has been observed that the peak melting point increases as the DP of the polyamide side chains increases. Such a plot can serve as a calibration curve which can be used for the determination of the DP of the polyamide grafts in the copolymers of the present invention.

The graft copolymers must be conditioned for testing by first heating to 250° C., then cooling at the rate of 10° C. per minute to 50° C. During the test, the sample is heated at the rate of 10° C. per minute.

DSC techniques are discussed in *Thermoanalytical Methods of Investigation*, by P. D. Garn, Academic Press, New York, 1965.

Another convenient and somewhat related technique for correlating the DP of the grafted polyamide with its melting point is differential thermal analysis (DTA). The sample also must be preconditioned and is heated during the test at the rate of 20° C. per minute. The details of the DTA technique are described in *Differential Thermal Analysis*, R. C. MacKenzie, Editor, Academic Press, New York, 1970; especially in Chapter 23, by C. B. Murphy, dealing with polymers, Vol. I, pp. 643–671.

It is to be noted that the above techniques relying on polymer melting point determination, DSC and DTA, can only be used for polymers having a high degree of crystallinity. In the present case, only the crystalline polyamide side chains will have well defined melting points, and those will be recorded. The elastomeric trunk polymers are usually noncrystalline at the test temperatures and will not produce any melting point peaks on DSC or DTA graphs. In the case of trunk copolymers containing a substantial proportion of ethylene (for example, certain ethylene/propylene/diene monomer copolymers having active site monomers grafted thereon), their crystallinity may be sufficiently high to produce a distinct melting point peak. This, however, will be well below the temperature range of interest and thus will not interfere with the determination.

The thermoplastic graft copolymers made by the process of this invention can be made into a wide variety of useful shaped articles by techniques and in equipment familiar to those skilled in the art. Conventional casting and compression and injection molding are suitable fabricating techniques. A reciprocating screw type injection molding machine in which shearing provides additional heating is the preferred apparatus; typically a machine having a 4.5kg charge can exert a clamping pressure of 1.225 million kg. Injection pressures of 900–1200 kg/sq.cm. and cycle times (mold closing to mold closing) of 150 seconds can be used.

The thermoplastic elastomeric compositions of the instant invention can be used in a wide variety of industrial applications including wire jacketing, hose, belts, miscellaneous molded boots, seals and gaskets; they can be also employed to make low speed, low pressure tires for off-the-road application; and they can be melt spun to give elastic fibers.

The preparation of representative starting trunk copolymers and 6-nylons and of the graft polymers of this invention is now illustrated by the following examples of certain representative embodiments thereof, wherein all parts, proportions, and percentages are by weight unless indicated otherwise.

The determination of physical and/or chemical properties of the starting trunk copolymers was carried out as follows:

a. inherent viscosity, deciliters per gram, was measured at 30° C. on a solution of 0.1 g of polymer in 100 ml. of chloroform, unless a different solvent is shown.

b. neutralization equivalent was determined by acid-base titration using standard aqueous sodium hydroxide, the anhydride being titrated as diacid, c. Wallace plasticity at 100° C. was determined according to the following procedure:

The Wallace plasticity is a measure of the amount of flow or deformation under load of unvulcanized elastomeric materials. The sample to be tested is sheeted and cut into pellets having a thickness in the range of 3.18 mm to 7.62 mm (0.125 to 0.300 inch). The test is done with a Wallace Plastimeter, manufactured by H. W. Wallace and Co., Ltd., London. Initially, for a 15-second period, the test pellet is compressed to a thickness of exactly one millimeter and heated to 100° C. Then the test pellet is subjected to a 10-kilogram load for exactly 15 seconds at 100° C. The final thickness of the test piece, expressed in units of 0.01 millimeter, is the plasticity reading.

d. melt index was measured at 190° C. under a 2160 g. load - ASTM Method D 1238–70, Condition E.

The degree of polymerization (DP) or molecular weight of the starting 6-nylons can be readily determined by end group analysis. The aminio end groups are determined by titration with a strong acid, either in the presence of an indicator or by a potentiometric or conductometric method. Acid end groups are determined by titration with a strong base. These techniques are discussed in Nylon Plastics, M. I. Kohan, Editor, pp. 38 and 105, John Wiley and Sons, New York (1973), and in Encyclopedia of Polymer Science and Technology. Vol. 10, pp. 542 and 543, John Wiley and Sons, New York (1969).

EXAMPLES

Preparation of Trunk Copolymers

A. Preparation of Ethylene/Methyl Acrylate/Monoethyl Maleate Copolymer

A terpolymer containing 46.6% ethylene, 50% methyl acrylate, and 3.6 weight percent monoethyl maleate and displaying a melt index of 3.6 g/10 min was prepared in a 0.72-liter stirred autoclave.

A mixture of methyl acrylate, monoethyl maleate, and benzene (weight ratio: 68.28/2.46/29.26) was pressured to about 422 kg/sq cm; ethylene was separately pressured to about 422 kg/sq cm. Separate streams of this mixture (0.91kg/hr) and ethylene (6.35 kg/hr) were joined and pressured to 1900 kg/sq cm. The resulting feed stream then entered the autoclave. Simultaneously, a catalyst solution, made by adding 50 ml of tert-butyl peroxypivalate to 4.5 kg of benzene was introduced at the rate of 0.00204 kg/hr to keep the temperature at 170° C. The effluent from the autoclave passed through a let-down valve to a chamber at atmospheric pressure where most of the residual monomers and solvent flashed off. The ethylene/methyl acrylate/monoethyl maleate terpolymer thus isolated was freed from the small amount of residual volatiles by heating for 16 hours at 80° C. in a nitrogen stream. Acid-base titration indicated that 0.25 meq. of acid groups was present per gram of terpolymer, corresponding to 3.6 weight % monoethyl maleate in the copolymer.

B. Preparation of Ethylene/Vinyl Acetate/Maleic Anhydride Copolymer

A terpolymer containing 60.3% ethylene, 38 weight percent vinyl acetate, and 1.7% maleic anhydride, and displaying a melt index of 220 g/10 min was prepared at the rate of 0.68 kg/hr in a continuous 0.72-liter stirred autoclave by the following procedure. Monomers were mixed, pressured to 1900 kg/sq cm, and fed at these rates:

| Ethylene | 4.54 kg/hr |
|---|---|
| Vinyl acetate | 2.29 kg/hr |
| Maleic anhydride | 0.015 kg/hr |

A solution of azobis(isobutyronitrile) in benzene was simultaneously introduced at a rate sufficient to keep the reactor temperature at 170° C (about 0.587 g/hr corresponding to 0.86 kg catalyst per 1000 kg of terpolymer). The total benzene feed rate was 1.04 kg/hr. The terpolymer produced was isolated by a procedure similar to that described in Example A.

C. Preparation of Ethylene/Vinyl Acetate/Maleic Anhydride Copolymer

A terpolymer containing 65.6% ethylene, 32% vinyl acetate, and 2.4% maleic anhydride, and displaying a melt index of 125 g/10 min was prepared at the rate of 0.63 kg/hr in a continuous 0.72-liter stirred autoclave by the following procedure. Monomers were mixed, pressured to 1900 kg/sq cm and fed at these rates:

| Ethylene | 4.54 kg/hr |
|---|---|
| Vinyl acetate | 1.80 kg/hr |
| Maleic anhydride | 0.0258 kg/hr |

A solution of azobis(isobutyronitrile) in benzene was introduced into the reactor at the same time and at a rate sufficient to keep the reactor temperature at 170° C (about 1.00 g/hr corresponding to 1.58 kg/1000 kg of terpolymer). The total benzene feed rate was 0.67 kg/hr. The terpolymer produced was isolated by a procedure similar to that described in Example A. Acid-base titration with standard aqueous sodium hydroxide indicated that 0.49 meq of diacid derived from anhydride groups was present per gram of terpolymer, corresponding to 2.4 weight % maleic anhydride in the copolymer.

$D_{(1)}$ Preparation of Alternating Ethylene//Ethyl Acrylate/Allyl Acrylate/Maleic Anhydride Tetrapolymer

A 7.57-liter stirred autoclave was charged under nitrogen with 4000 ml of methylene chloride, 400 grams of ethyl acrylate, 20 grams of maleic anhydride, 1.2 grams of allyl acrylate, and 1.0 gram of azobis-(isobutyronitrile). It was then sealed, charged with 300 grams of boron trifluoride, and pressured to 21 kg/sq cm with ethylene. The subsequent copolymerization at 25° C was continued until pressure measurement indicated that ethylene uptake had ceased (about two hours later). The reaction was quenched by addition of one liter of diethyl ether. Volatiles were removed by steam-stripping in a well-ventilated hood. The terpolymer thereby obtained was dissolved in acetone, precipitated in water in a blender, and oven-dried. Yield: 415 grams.

This product had about 50 mole percent ethylene units and was slightly branched because of the use of the direactive allyl acrylate. The polymer chain consisted principally of alternating units -(E)-(B)-, where E is ethylene and B is selected randomly from ethyl acrylate, allyl acrylate, and maleic anhydride.

$D_{(2)}$ Preparation of Alternating Ethylene//Ethyl Acrylate/Ethylene Diacrylate/Maleic Anhydride Tetrapolymer

The procedure of $D_{(1)}$, above, was repeated except that 1.2 grams of ethylene diacrylate was used in place of the allyl acrylate. Yield: 479 grams. The branched alternating tetrapolymer obtained had about 50 mole percent of ethylene units. The polymer chain consisted principally of alternating units -(E)-(B')-, where E is ethylene and B' is randomly selected from ethyl acrylate, ethylene diacrylate, and maleic anhydride.

$D_{(3)}$ Preparation of Alternating Ethylene/Ethyl Acrylate/Ethylene Diacrylate/Maleic Anhydride Tetrapolymer

The procedure of $D_{(1)}$ above was repeated except that 0.75 gram of ethylene diacrylate was used in place of the allyl acrylate, and the amount of maleic anhydride was increased to 30 grams. Yield: 417 grams. The branched alternating tetrapolymer had about 50 mole percent of ethylene units, the units being arranged -(E)-(B')-, as in $D_{(2)}$. $D_{(4)}$ Blend of Branched Alternating Copolymers The branched alternating copolymers made by procedures $D_{(1)}$, $D_{(2)}$, and $D_{(3)}$ were blended on a rubber roll mill. Table I gives the properties of the blend and its components.

TABLE I

| Copolymer D | Parts in Blend | Weight % maleic anhydride | Inh. Visc. | Wallace Plast. | Neut. Eq. meq. g |
|---|---|---|---|---|---|
| (1) | 397 | 2.5 | 1.91 | 16.8 | 0.52 |
| (2) | 479 | 3.8 | 1.33 | 15 | 0.77 |
| (3) | 417 | 3.9 | 1.21 | 15 | 0.80 |

TABLE I-continued

| Copolymer D | Parts in Blend | Weight % maleic anhydride | Inh. Visc. | Wallace Plast. | Neut. Eq. meq. / g |
|---|---|---|---|---|---|
| Blend (4) | — | 3.4 | 1.75 | 14 | 0.70 |

E. Preparation of Alternating Ethylene//Ethyl Acrylate/Allyl Acrylate/Maleic Anhydride Tetrapolymer The procedure of Part $D_{(1)}$ was repeated except that the pressure of ethylene was 42.2 kg/sq cm. Yield: 233 grams. The tetrapolymer had an inherent viscosity of 2.37 deciliters/gram, a Wallace Plasticity of 24.4, and a neutralization equivalent of 0.49 meq/gram, corresponding to 2.4 weight % maleic anhydride in the copolymer.

$F_{(1),(2)}$ Preparation of Alternating Ethylene//Ethyl Acrylate/Allyl Acrylate/Maleic Anhydride Tetrapolymers The procedure of Part $D_{(1)}$ was twice repeated except that the amount of maleic anhydride was decreased each time to 10 grams. Yields: 481 grams and 497 grams.

$F_{(3)}$ Preparation of Alternating Ethylene/Ethyl Acrylate/Ethylene Diacrylate/Maleic Anhydride Tetrapolymer The procedure of Part $D_{(1)}$ was repeated except that 0.75 gram of ethylene diacrylate was used in place of allyl acrylate. Yield: 476 grams.

$F_{(4)}$ Preparation of Blends of Branched Alternating Copolymers

A trunk copolymer composition was prepared by blending copolymers $F_{(1)}$, $F_{(2)}$, and $F_{(3)}$ on a rubber roll mill. Table II gives characteristic properties.

TABLE II

| Component | Parts in Blend | Weight % maleic anhydride | Inh. Visc. | Wallace Plast. | Neut. Eq. meq. / g |
|---|---|---|---|---|---|
| $F_{(1)}$ | 336 | 1.8 | 1.97 | 15.5 | 0.36 |
| $F_{(2)}$ | 292 | 2.1 | 1.78 | 13.3 | 0.42 |
| $F_{(3)}$ | 241 | 2.3 | 1.52 | 14 | 0.46 |
| Blend $F_{(4)}$ | — | 2.1 | 1.44 | 13.5 | 0.43 |

G. Preparation of Ethyl Acrylate/Monoethyl Fumarate Copolymer

In a 3-neck round-bottom flask, a mechanically stirred mixture of 500 ml of benzene, 100 ml of inhibited ethyl acrylate, 7.2 grams of monoethyl fumarate, and 0.25 gram of azobis(isobutyronitrile) was sparged with nitrogen for 30 minutes, then heated at 50° C. under a nitrogen blanket for 24 hours. The copolymer was isolated by steam-stripping in a well-ventilated hood and dried overnight in a nitrogen-bled vacuum oven at 70° C. Conversion was 86%. Prior to analysis and use, the copolymer was purified by dissolution in acetone, precipitation in water in a blender, and vacuum oven drying. Properties are given in Table III, below.

$H_{(1),(2)}$ preparation of Ethyl Acrylate/Maleic Anhydride Copolymers

1. The reactor was a two-liter resin flask fitted with an agitator, a condenser and a dropping funnel. A 710-ml charge of ethyl acetate and 0.2 gram of benzoyl peroxide was added and stirred under nitrogen while being heated to reflux. A mixture of 500 grams of inhibitor-free ethyl acrylate, 10 grams of maleic anhydride, and one gram of benzoyl peroxide was placed in the dropping funnel. A 50-ml charge of this monomer feed was added all at once to the stirred refluxing solution in the flask; the rest was added over a period of 3.5 hours. After additional two hours at reflux, the reaction mixture was steam-distilled in a hood with good ventilation to remove solvent and residual monomers. The copolymer thus isolated was washed with water on a wash mill, partially dried on a hot rubber roll mill, and then heated in a nitrogen bled vacuum oven for 22 hours at 130° C. to remove residual volatiles. Yield: 448 grams.

2. The same equipment was used as in $H_{(1)}$ above. The ethyl acrylate/maleic anhydride copolymer was prepared as follows. A mixture of 500 grams of ethyl acrylate, 10 grams of maleic anhydride, and 0.5 gram of benzoyl peroxide was added to 490 grams of refluxing ethyl acetate over a 4-hour period. After about 85% of this feed mixture had been introduced, 140 ml of cyclohexane and 35 ml of ethyl acetate were added. When all the feed was in, 80 ml more of ethyl acetate were added. Reflux continued for one hour. Heat was then removed and the mixture was allowed to stand for 36 hours. Finally, 0.5 gram of hydroquinone was added and the copolymer was isolated by steam-stripping the volatiles in a well-ventilated hood. Mill drying and vacuum oven drying (20 hours at 130° C.) followed. Yield: 364 grams.

Properties of the copolymers prepared as described in Section G, $H_{(1)}$ and $H_{(2)}$ are given in Table III.

TABLE III

| Copolymer | Maleic Anh., % | Weight % monoethyl fumarate | Inh. Visc. | Wallace Plast | Acidity | meq.[a] / g. |
|---|---|---|---|---|---|---|
| G | — | 4.3 | 2.32 | undet'd. | | .30 |
| $H_{(1)}$ | 1.5 | — | 1.24 | 5 | | .31 |
| $H_{(2)}$ | 1.4 | — | 2.03 | 14 | | .29 |

[a] acid-base titration with standard aqueous sodium hydroxide; values for $H_{(1)}$ and $H_{(2)}$ were each 0.15 meq./g. when alcoholic potassium hydroxide was used; proportion of maleic anhydride calculated from sodium hydroxide values I. Preparation of Ethyl Acrylate/Butyl Acrylate/Monoethyl Fumarate Terpolymer The reactor was a nitrogen-blanketed two-liter resin flask fitted with an agitator, a condenser, and a dropping funnel.

Monomers ethyl acrylate and butyl acrylate were passed through alumina to remove polymerization inhibitors. Then, 70 grams of the ethyl acrylate, 70 grams of the butyl acrylate, 10.5 grams of monoethyl fumarate, 21 grams of "Igepal Co-730" [nonylphenoxypoly(ethylene glycol) having about 15 $-O-CH_2-CH_2-$ units], 1050 grams of water, and 1.0 gram of ammonium persulfate were added to the resin flask and heated to reflux. A mixture of 113 grams of ethyl acrylate, 113 grams of butyl acrylate, 9.4 grams of monoethyl fumarate, and 3.8 grams of "Igepal CO-730" was gradually introduced at a rate to keep the reaction temperature at 89° to 93° C. After 1.4 hours, all the feed had been added and stirring was becoming difficult. After additional 20 minutes, the temperature of the reaction mixture had risen to 96° C., whereupon 0.15 gram of hydroquinone was added, and residual monomers were removed by a 2-hour steam-distillation in a well-ventilated hood.

Coagulated polymer was washed by chopping in a blender with water, twice dissolved in acetone and reprecipitated in water in a blender, then air-dried, vacuum-oven dried 3.5 hrs. at 72° C., and finally mill-dried at about 130° C. Yield: 254 g. The terpolymer produced had an inherent viscosity (chloroform, 30° C.) of 1.51 deciliters/gram and an acid content of 0.24 meq/gram (titration with aqueous sodium hydroxide), or 0.23 meq/gram (titration with alcoholic potassium hydroxide). The terpolymer had 3.3 weight % monoethyl fumarate; the remainder was believed to be about equally divided between ethyl acrylate and butyl acrylate.

J. Preparation of An EPDM/Maleic Anhydride Adduct

Maleic anhydride was grafted on an ethylene/propylene/1,4-hexadiene copolymer. The ethylene/propylene/1,4-hexadiene copolymer was a sulfur-curable elastomer having a Mooney (ML-1+4/121° C.) viscosity of about 35 and the following monomer unit composition: ethylene, 61.4 weight %; propylene, 32 weight %; 1,4-hexadiene, 6.6 weight %. The copolymer had about 0.5 gram mole of ethylenically unsaturated side-chains per kilogram. Its Wallace Plasticity was about 28 at 100° C. and its inherent viscosity was about 2.0 (measured at 30° C. on a solution of 0.1 gram of copolymer in 100 milliliters of tetrachloroethylene). Copolymerization was carried out in solution in hexane in the presence of a Ziegler catalyst formed by mixing $VCl_4$ and diisobutylaluminum chloride.

A Werner and Pfleiderer 53 mm twin screw extruder was assembled by end-to-end attachment of sixteen barrel sections of 1.27 cm (½ inch) diameter. Following a short feed section were four reaction sections (zones 1–4), one vacuum port section (zone 5), a cooling section (zone 6), and a die section. Provisions were made for the metering of molten maleic anhydride at the forward part of zone 1. The screws were composed of kneading blocks, reverse pitch screws, and transport screws arranged to generate 7.0–14.1 kg/sq.cm (100-200 psi) pressure in zones 1–4 and no pressure in zone 5. The free volume of zones 1–5 was equivalent to 0.91 kg (two pounds) of polymer at operating temperature. Zones 1–4 were preheated to 300° C., zone 5 to 260° C., and zone 6, the cross-head, and the die to 150° C.

The above ethylene/propylene/1,4-hexadiene copolymer was fed to the extruder in the form of chips which passed a 1.27 cm (½-inch) screen. Maleic anhydride was metered to the extruder at an average feed rate of 4.8% of the polymer weight. The screw speed was 12 rpm, and the vacuum port was operated at about 63.5 cm (25 inches) Hg.

The product, extruded at the rate of 2.79 kg/hr. (6.15 lb./hr.), had a maleic anhydride content of 2.23%, as determined by infrared spectroscopy, and 2.19% by weight as determined by titration in tetrahydrofuran with 0.1 M tetrabutylammonium hydroxide in methanol. Wallace plasticity of the product was 33, and gel content was less than about 5%.

Following purification of a small sample by solution in tetrahydrofuran and precipitation with anhydrous acetone, the maleic anhydride content was 2.19% and 2.05% by weight, respectively, by infrared and titration and determination. The gel content was less than about 5%. The inherent viscosity was 1.5 deciliters/gram as measured on 0.1 gram of adduct dissolved in 100 milliliters of perchloroethylene at 30° C.

The rest of the product was washed on a wash mill at 125° C. for 20 minutes and dried on a 15.2 × 30.5 cm (6 × 12-inch) mill.

Preparation of $H_2N$-Terminated 6-Nylons

Amine-terminated polyamides were prepared by procedures K-S which are completely summarized in Table IV below. Additional details are provided for Procedures L, N, Q and S, which are typical processes.

PROCEDURE L

In each of two 400-ml stainless steel rocker bombs was placed a mixture of 120 g of caprolactam, 10 g of octadecylamine, 0.3 g of diethyl phosphate, and 120 ml of benzene. Both bombs were flushed with nitrogen, sealed under nitrogen, and shaken at 275° C. for 17 hours. The benzene-wet cakes of granular product were combined and soaked in acetone for 5 days, then extracted overnight with acetone in a Soxhlet assembly. The resulting powdery amine-terminated nylon product was air-dried in a hood, then vacuum-oven dried at 50° C. for one hour. Analysis are in Table IV.

PROCEDURE N

A charge of 300 g of caprolactam and 100 ml of water was sealed under nitrogen in a 1.4-1 stainless steel rocker bomb and heated over a period of 2.1 hours to 280° C., held there for 3 hours, then cooled to room temperature. After additional 650 ml of water had been added under nitrogen, the bomb was again sealed and shaken while being subjected to the following temperature schedule: 1.2 hours heating to reach 210° C., 15 minutes at 210° C., cooling over 20 minutes to 135° C., 2 hours at 135° C., then cooling over 1.2 hours to room temperature. The resulting product, a partial slurry of powder, granules, and cake, was partly de-watered by filtration, then chopped in a blender with fresh warm water. Acetone was added to increase slurry volume by 50%, and the solids were isolated by filtration. After being air-dried in a hood, then dried in a vacuum oven for 8 hours at 100° C. (nitrogen bleed), the amine-terminated nylon product weighed 217 grams. Analyses are in Table IV.

PROCEDURE Q

A charge of 769grams of caprolactam, 32 grams of butylamine, and 15 grams of water was sealed under nitrogen in a 1.4-liter stainless steel rocker bomb, heated over a 2.5-hour period to 280° C., shaken at 280° C. for 7 hours, then cooled over a 3.2-hour period to room temperature. The product, a brittle cake, was mechanically chopped to a coarse granular condition. A 317.9-gram portion of the total product was rolled overnight in a sealed 7.57-liter (2-gallon) jar with 1.42 liters (3 pints) of methanol. Insoluble material was collected on a filter, washed in two portions with 0.47 liter (one pint) of methanol, briefly air-dried, and then dried in a nitrogen-bled vacuum oven for 3 hours at 75° C. Dry extracted product weighed 267.6 grams. Analyses of a smaller sample (15 grams) similarly extracted with methanol are shown in Table IV.

PROCEDURE S

A mixture of 70 grams of caprolactam, 6 grams of 1-octadecylamine, and 195 milliliters of diphenyl ether was placed in a 0.4-liter stainless steel rocker bomb. After the system had been evacuated and filled with nitrogen two times, it was closed under vacuum and shaken for about 8 hours at 260° C.; heating and shaking continued for two days, the final temperature being 235° C.

The resulting mixture was washed on a filter with acetone and shaken for three days in acetone to remove diphenyl ether. The product was collected on a filter, washed with acetone, and extracted overnight in a Soxhlet extractor with acetone. Drying in air and then a vacuum desiccator at 50° C. gave the 6-nylon as a powder having an inherent viscosity of 0.21 deciliters/-gram (at 30° C. in m-cresol) and 0.383, 0.388 eq. $-NH_2$ groups/kg. (corresponding to a molecular weight of about 2600 and a D.P. of about 21).

TABLE IV

| | Low Molecular Weight Amine-Terminated 6-Nylon Preparations | | | | | | | | |
|---|---|---|---|---|---|---|---|---|---|
| | K | L | M | N | O | P | Q | R | S |
| Nitrogen-Blanketed Polymerization Charge Composition, g. | | | | | | | | | |
| caprolactam | 140 | 240 | 295 | 300 | 283 | 283 | 769 | 769 | 70 |
| octadecylamine | 10 | 20 | | | | | | | 6 |
| octylamine | | | 23 | | 32.2 | 20.8 | | | |
| butylamine | | | | | | | 32 | 32 | |
| ε-aminocaproic acid | | | | 5 | | | | | |
| water | | | | 100 | 4 | 4 | 15 | 15 | |
| diethyl phosphate | 0.2 | 0.6 | | | | | | | |
| diphenyl ether | 135 | | | | | | | | 195 |
| benzene | | 240 | | | | | | | |
| Post-polymerization Diluent, g.[a] | | | | | | | | | |
| benzene | | | 300 | | | | | | |
| water | | | | 650 | | | | | |
| methanol | | | | | 451 | 451 | | | |
| Polymerization Conditions | | | | | | | | | |
| Hastelloy or stainless steel rocker tube vessel size, l | 0.4 | 2×0.4 | 1 | 1.4 | 1.4 | 1.4 | 1.4 | 1.4 | 0.4 |
| reaction temperature, ° C.[b] | 260 | 275 | 245, 230 | 280, 210 | 280, 230 | 280, 230 | 280 | 245 | 260, 235 |
| reaction time, hrs.[b] | 19.5 | 17 | 20, .5 | 3, .3 | 3.5, .5 | 3.5, .5 | 7 | 3 | 56 |
| Granulation Technique[a] | diluent | diluent | diluent | diluent | diluent | diluent | chopping | chopping | diluent |
| Purification Technique | | | | | | | | | |
| Overnight Soxhlet extraction solvent | acetone | acetone | | | | | | | acetone |
| Overnight reflux in 10X wt. solvent | | | | water | | | | | |
| Overnight roller extraction, solvent | | | | | | | | methanol | |
| Blender washing, solvent | | | | [g] | [h] | | | | |
| Centrifugation/decantation washing, solvent (reps.) | | | | | | methanol(3) | | | |
| After filtration collection, air drying: | | | | | | | | | |
| Vacuum oven (N₂-bleed)drying: Temp/Time (° C./hrs.) | | 50/1 | 100/40 | 100/8 | 100/15 | 100/24 | 75/3 | | |
| Purified 6-Nylon Properties | | | | | | | | | |
| yield, g. | 101.5 | ~180 | ~258 | 217 | 250 | 222.2 | ~652 | 798.3 | — |
| NH₂ end-groups, meq./g.[c] | .198 | .241 | .428 | .45 | .61 | .46 | ~.46 | .495[f] | 0.383 |
| COOH end-groups, meq./g.[d] | | | | .287 | | | | | |
| ηinh (m-cresol, 30° C.) | .38 | .36 | .27 | .30 | .19 | .23 | ~.29 | — | 0.21 |
| Differential scanning colorimeter melting point, ° C.[e] | 216 | 217 | 210 | 220 | 209.5 | 214 | ~217 | — | — |
| Mol. Wt. from NH₂ titration | 5050 | 4150 | 2335 | 2220 | 1640 | 2170 | 2170 | 2020 | 2600 |
| DP | 42.4 | 34.5 | 19.5 | 19.5 | 13.5 | 18 | 18.5 | 17 | 21 |

[a]Inert diluent provided the nylon in finely-divided form if the polymerizate was shaken with the diluent above the melting point of the nylon.
[b]The Table does not include times required to reach reaction temperature (usually 1.3–2.3 hours) or cool down (~1–3 hours). A second pair of temperature and time values refers to a second heating period after addition of post-polymerization diluent.
[c]A ~0.8-gram nylon sample is dissolved by warming in 25 ml of o-cresol, and treated with 1.5 ml of water, then 7.5 ml of chloroform, cooled, and titrated potentiometrically (Beckmann No. 39501 combination electrode) with standard 0.03N ethanolic potassium hydroxide.
[d]A ~0.1 gram nylon sample is dissolved by warming in 80-ml m-cresol. After cooling, 10 ml of chloroform is added and the resulting composition is titrated potentiometrically (glass-modified calomel electrode) with standard 0.01N 2,4-dinitrobenzenesulfonic acid in acetic acid.
[e]Samples were programmed at 10° C./min. through a cycle of 50° C.⟶250° C.⟶50° C.⟶250° C., and the peak melting endotherm of the second heating cycle taken as the melting point. A shoulder at a lower temperature was usually observed.
[f]Caprolactam, residual amine initiator, and low oligomers had not been extracted before analysis.
[g]1) hot H₂O, 2) acetone/H₂O (1/3).
[h]1) methanol, 2) methanol/acetone (5/2).

Preparation of NH₂-Terminated 12-Nylons

PROCEDURE T

A mixture of 59.6 grams of ω-laurolactam and 4.8 grams of 1-octadecylamine was heated in a glass polymer tube. After the resulting melt had been allowed to crystallize, 0.16 gram of diethyl phosphate $(CH_3CH_2O)_2PO_2H$ was added. The tube was then evacuated and filled with nitrogen about five times. While under vacuum the neck of the tube was sealed. The mixture was then heated at about 285 to 288° C. for about 9.5 hours. The 12-nylon obtained (yield about 45 grams) had a melting point of about 145°–150° C., an inherent viscosity of 0.34 deciliters/gram (at 30° C. in m-cresol), and 0.225, 0.226 equivalent of —NH$_2$ groups per kg. (corresponding to a molecular weight of 4430 and a D.P. of about 21).

PROCEDURE U

A mixture of 50 grams of ω-laurolactam and 10.5 ml. (13.8 g.) of n-hexylamine was placed in a heavy stainless steel tube, which was evacuated, flushed with nitrogen, and filled with nitrogen, then sealed and heated sixteen hours at 255° C. The resulting nylon contained 0.492 equivalent of —NH$_2$ groups per kilogram. The molecular weight of the nylon thus was about 2030 and its D.P. was about 9.5.

ADDITIONAL 12-NYLONS

Additional 12-nylons were made by method U using n-hexylamine as the polymerization initiator. The products had D.P.'s of 5.3, 7.0, 10.2, 14.3, 15.6, 24.0, and 15.6, respectively.

EXAMPLES 1-13

Preparation of 6-Nylon Graft Copolymers

Table V below summarizes the preparation, composition, and properties of representative 6-nylon graft polymers of the present invention.

For all graft products, slabs for testing could be prepared by brief compression molding at 235° C., followed by rapid (~2 min.) cooling and immediate demolding. Annealing of these slabs at 135° C. for 4 to 5 hours generally improved compression set about 20 to 35 points but had little effect on other properties. The grafting procedure used in Example 7 of Table V is illustrative of the process:

Example 7

A mixture of 36 grams of the ethylene/vinyl acetate/maleic anhydride trunk copolymer of Procedure C, 14 grams of the powdered low molecular weight, H$_2$N-terminated 6-nylon of Procedure N, 0.1 gram of tris (mono- and di-nonylphenyl) phosphite stabilizer ["Polygard" from Uniroyal], 0.1 gram of stabilizer N-phenyl-N'-(p-toluenesulfonyl)-p-phenylenediamine ["Aranox" from Uniroyal], 0.1 gram of 1,3,5-trimethyl-2,4,6-tris(3,5-di-tert-butyl-4-hydroxybenzyl)benzene ["Ionol 330" from Shell], and 0.05 gram of a 7:1 weight mixture of potassium iodide and cuprous iodide was homogenized as thoroughly as possible on an unheated rubber roll mill. The resulting blend was then transferred to an electrically heated mill held at 215° and masticated at 215° C. under a partial nitrogen blanket for 15 minutes to effect grafting. At this point the material was ready for fabrication.

TABLE V

Graft Copolymer Preparation, Composition, and Properties

| Example | 1 | 2 | 3 | 4[a] | 5 | 6 | 7 | 8 | 9 | 10 | 11 | 12 | 13 |
|---|---|---|---|---|---|---|---|---|---|---|---|---|---|
| Trunk Copolymer | E | F(4) | D(4) | F(1) | H(2) | H(1) | C | B | A | A | G[c] | I[c] | I |
| " type[b] | Branched Alt. E/EA/AA/MAnh | Blend Branched Alt. E/EA/MAnh | as in Ex. 2 | as in Ex. 1 | EA/MAnh | as in Ex. 5 | E/VAc/MAnh | as in Ex. 7 | E/MA/MAME | as in Ex. 9 | EA/FAME | EA/BA/FAME | as in Ex.12 |
| "graft site | MAnh | as in Ex. 1 | as in Ex. 1 | as in Ex. 1 | as in Ex. 1 | as in Ex. 1 | as in Ex. 1 | as in Ex. 1 | MAME | as in Ex. 9 | FAME | as in Ex.11 | as in Ex.11 |
| "graft site conc. meq/g | .235 | .215 | .35 | .18 | .15 | .155 | .245 | .173 | .25 | .25 | .29 | .24 | .24 |
| Nylon | P | Q | R | K | L | N | O | M | O | O | O | O | O |
| "initiator[d] | Octyl-amine | Butyl-amine | as in Ex. 2 | Octa-decyl-amine | as in Ex. 4 | H$_2$O | as in Ex. 1 | as in Ex. 1 | as in Ex. 1 | as in Ex. 1 | as in Ex. 1 | as in Ex. 1 | as in Ex. 1 |
| " NH$_2$ conc. meq./g | .46 | ~.46 | ~.495 | .198 | .24 | .45 | .61 | .428 | .61 | .61 | .61 | .61 | .61 |
| phr Nylon[e] | 50.6 | 40 | 50 | 80 | 55 | 30 | 39 | 34 | 40 | 39 | 50 | 39 | 39 |
| Graft Reaction Apparatus | Extruder | Plasto-graph[f] | Plasto-graph | Plasto-graph | Plasto-graph | Mill[g] | Mill | Plasto-graph | Extrud-er | Mill | Mill | Mill | Plasto-graph |
| Graft Reaction Conditions: | | | | | | | | | | | | | |
| Reactor Wall T, ° C.[h] | ~230 | 220 | 220 | ~210[i] | ~210[i] | 220 | 215 | 220 | ~230 | 215 | 210 | 210 | 220 |
| Residence Time min. | ~16.4 | 10 | 10 | 20 | 20 | 15 | 15 | 18 | ~6.7 | 15 | 12 | 12 | 10 |
| Graft Copolymer Physical Properties[j]: | | | | | | | | | | | | | |
| Shore A Hardness | 83 | 76 | 81 | 85 | 77 | 64 | 91 | 85 | 67 | 63 | 92 | 83 | 71 |
| T$_B$, kg./sq.cm. | 224 | 220 | 165 | 189 | 159 | 120 | 167 | 162 | 141 | 134 | 139 | 97 | 88 |
| E$_B$, % | 370 | 460 | 430 | 300 | 220 | 270 | 390 | 330 | 480 | 500 | 180 | 210 | 240 |
| M$_{100}$, kg./sq.cm. | 86 | 67 | 58 | 110 | 79 | 58 | 78 | 84 | 48 | 28 | 115 | 70 | 34 |
| Comp. Set, % (22 hrs./70° C., | 23 | 22 | 35 | 33 | 26 | 35 | 32 | 34 | 28 | 34 | 37 | 38 | 43 |

TABLE V-continued

| Example | 1 | 2 | 3 | 4[a] | 5 | 6 | 7 | 8 | 9 | 10 | 11 | 12 | 13 |
|---|---|---|---|---|---|---|---|---|---|---|---|---|---|
| | | | | | Graft Copolymer Preparation, Composition, and Properties | | | | | | | | |
| Method B) | | | | | | | | | | | | | |

[a] A small amount (0.4 phr) of aniline was added after the grafting reaction.
[b] E=ethylene; EA=ethyl acrylate; (alt.) refers to alternating, rather than random copolymer; VAC=vinyl acetate; MA=methyl acrylate; BA=butyl acrylate; AA=allyl acrylate; MAnh=maleic anhydride; MAME=monoethyl maleate; FAME=monoethyl fumarate. These units are copolymerized in the trunk copolymer.
[c] Mill blends were treated 15 hours in a nitrogen-bled 130° C. vacuum oven just before the grafting reaction. Subsequent experiments showed that his treatment had negligible effect on product physical properties.
[d] The alkyl group of the initiator becomes one end-group of nearly all the polymer chains. The other end-group is nearly always $NH_2$.
[e] Parts of nylon by weight per hundred parts of trunk polymer.
[f] Brabender Plastograph, an apparatus having a small, electrically heated chamber with two convoluted rollers capable of shear-mixing and masticating polymer at a selected high temperature.
[g] An electrically-heated mill was used for the required temperature.
[h] Polymer is not necessarily at this temperature at all times. There is usually an initial warm-up period followed by a modest overshoot, perhaps because of an exothermic reaction.
[i] Accurate temperature readings were not obtained here.
[j] All graft products, in addition to the components listed here, contained a mixture of stabilizers quite similar to that described in the detailed Example (7). The following ASTM methods were used: Shore A, D-2240-68; Tensile Stress ($T_B$), D-412-68 Tensile Strain ($E_B$), D-412-68; Stress at 100% Elongation ($M_{100}$), D-412-68; Compression Set after 22 hrs at 70° C., D-395-67 (all values measured at 25° C.). Specimens annealed for 4 hrs. at 135°C.

EXAMPLES 14-22

Preparation of Additional 6-Nylon and of 12-Nylon Graft Copolymers Based on Ethylene/Methyl Acrylate/Monoethyl Maleate Copolymers Copolymers of ethylene, maleic anhydride (MA), and monoethyl maleate (MAME were prepared according to the method A, above, except that the proportions of the comonomers were varied. Grafting of low molecular weight 6-nylons and 12-nylons was accomplished either on a roll mill under nitrogen blanket at about 225° C. or in a twin screw extruder at about 225° C. Detailed information on these preparations is presented in Table VI, below.

For testing for tensile strength and flex modulus, the specimens were injection-molded at 225–235° C. and held under nitrogen for at least one day at 23° C. The following test procedures were used:

Tensile strength and elongation at break — ASTM D-638-72

Flex modulus — ASTM D-790-71

The determination of the torsion modulus was made in accordance with the following reference:

ANELASTIC AND DIELECTRIC EFFECTS IN POLYMERIC SOLIDS, N. G. McCrum, B. E. Read, G. Williams, published by John Wiley and Sons, pages 192-195 (1967).

TABLE VI

| Experiment | 14 | 15 | 16 | 17 | 18 | 19 | 20 | 21 | 22 |
|---|---|---|---|---|---|---|---|---|---|
| Trunk Polymer | | | | | | | | | |
| % Ethylene | 36.3 | 36.3 | 40.6 | 40.6 | 42.8 | 42.8 | 42.8 | 42.8 | 40.6 |
| % Methyl Acrylate | 39.7 | 39.7 | 50.8 | 50.8 | 51.4 | 51.4 | 51.4 | 51.4 | 50.8 |
| % MAME | 24 | 24 | 8.64 | 8.64 | 5.76 | 5.76 | 5.76 | 5.76 | 8.64 |
| Melt Index | 32.8 | 32.8 | 6.6 | 6.6 | 4.5 | 4.5 | 4.5 | 4.5 | 6.6 |
| Nylon | 6 | 6 | 6 | 6 | 6 | 6 | 12 | 6 | 12 |
| DP | 7.0 | 7.0 | 10.2 | 14.3 | 24.0 | 24.0 | 15.6 | 39.5 | 5.3 |
| End Group | H.A.[a] | H.A.[a] | COOH | COOH | COOH | COOH | H.A.[a] | COOH | H.A.[a] |
| % Polyamide | 25 | 35 | 25 | 33 | 25 | 35 | 25 | 40 | 25 |
| Reaction Type | Roll Mill | Roll Mill | Roll Mill | Roll Mill | Roll Mill | Roll Mill | Roll Mill | Extruder | Extruder |
| DTA Melt. Pt., ° C. | | | | | | | | | |
| Peak | 158, 165 | 180 | 207 | 209 | 214 | 212 | 168 | 208 | 158 |
| End | 220, 231 | 195 | 213 | 213 | 219 | 219 | 175 | 217 | 163 |
| Flex. Modulus, kg/cm² | 552 | 1083 | 91 | 178 | 132 | 23 | 30 | 1019 | 510 |
| Tensile Strength, kg/cm² | 61 | 92 | 68 | 62 | 61 | 25 | 44 | 145 | 98 |
| Elongation at break, % | 190 | 130 | 400 | 230 | 120 | 300 | 620 | 310 | 190 |
| Torsion Modulus × 10⁻⁹, dynes/cm.² | | | | | | | | | |
| −180° C. | 12.66 | 14.77 | 14.90 | 16.19 | 15.54 | 15.29 | 27.59 | 14.41 | 14.69 |
| −100° C. | 9.80 | 11.94 | 10.18 | 11.84 | 11.07 | 9.23 | 16.97 | 9.59 | 8.96 |
| −50° C. | 7.41 | 8.42 | 4.76 | 6.65 | 5.42 | 5.60 | 9.39 | 5.54 | 6.20 |
| 0° C. | 1.57 | 2.13 | .07 | .20 | .18 | .05 | .10 | 1.00 | .22 |
| 20° C. | .90 | 1.64 | .05 | .16 | .16 | .04 | .10 | .89 | .18 |
| 50° C. | .28 | .60 | .04 | .11 | .12 | .03 | .08 | .65 | .12 |
| 100° C. | .09 | .20 | .02 | .05 | .06 | .01 | .04 | .20 | .06 |
| 150° C. | .04 | .11 | .015 | .04 | .04 | — | — | .12 | .02 |

[a] N-hexylamido group, $-\overset{\overset{O}{\|}}{C}-NH-C_6H_{13}$

EXAMPLES 23 AND 24

Preparation of 6-Nylon and 12-Nylon Graft Copolymers on EPDM Copolymers

A Brabender Plastograph was used having a capacity of about 50 grams and heated by circulating oil (temperature 250° C.). Revolving cam-shaped blades kneaded and sheared. A nitrogen blanket was maintained at all times.

After 30 grams of the EPDM copolymer-maleic anhydride adduct J, above, had been added, an antioxidant mixture, an oil mixture, and an amino-terminated 6- or 12-nylon (S or T, above) were added successively as quickly as possible. Mixing then continued for 12 minutes. The resulting nylon graft copolymer was dumped. Table VII gives the properties of a 6-nylon and a 12-nylon graft.

The antioxidant mixture employed (0.7 gram) consisted of 0.3 gram of N-phenyl-N′-(p-toluenesulfonyl)-p-phenylenediamine ["Aranox"], 0.3 gram of 1,3,5- trimethyl-2,4,6-tris(3,5-di-tert-butyl-4-hydroxybenzyl)benzene [Ethyl Antioxidant 330, formerly "Ionox 330"], and 0.1 gram of a 7:1 weight mixture of potassium iodide and cuprous iodide.

The oil mixture consisted of the antioxidant tris(mono- and di-nonylphenyl) phosphite ["Polygard" from Uniroyal] and "Sunpar" paraffinic oil 2280 [ASTM D-2226 type 104B, having Saybolt Universal Viscosity values of 2907 sec. and 165 sec. at 37.8° C. (100° F.) and 98.9° C. (210° F.), respectively; specific gravity, 0.8916 at 15.6° C. (60° F.); density, 0.8879 g/cc; molecular weight, 720; viscosity-gravity constant, 0.796; refractive index $n_D^{20}$, 1.4908]. All mixtures contained 0.3 gram of the antioxidant; the oil amounted to 10.5 grams for 6-nylon grafting and 8.5 grams for 12-nylon grafting.

TABLE VII

| Poperties | 6-Nylon Graft | 12-Nylon Graft |
|---|---|---|
| Tensile Strength, kg./sq.cm. | 97.7 | 79.4, 66.1 |
| Extension at Break, % | 680 | 620, 660 |
| Modulus at | | |
| 100% Extension, kg./sq.cm. | 26.7 | 33.7 |
| 200% Extension, kg./sq.cm. | 36.6 | 40.1 |
| 300% Extension, kg./sq.cm. | 47.1 | 46.4 |
| Permanent Set at Break, % | 40 | 80 |
| Compression Set (Method B, 22 hrs./70° C.), % | 77 | 83 |
| Shore A hardness | 66 | 84 |
| Fast Tear, 127 cm./min., kg./cm. | 11.8 | 21.4 |

We claim:
1. An elastomeric, thermoplastic graft copolymer consisting essentially of
   A. an elastomeric trunk copolymer derived from at least two monomers, at least one of said monomers providing amine-reactive sites selected from the class consisting of an anhydride group, a vicinal pair of carboxylic groups, and a carboxylic group adjacent to an alkoxy-, phenoxy-, napthoxy-, substituted phenoxy-, or substituted naphthoxycarbonyl group, where the alkyl of the alkoxycarbonyl group has 1-10 carbon atoms, and the substituents of substituted phenoxycarbonyl and naphthoxycarbonyl groups can be a $C_1$-$C_{10}$ alkyl, halogen, or a $C_1$-$C_{10}$ alkoxy group; at least one of said monomers containing no amine-reactive sites and none of said monomers containing hydroxyl or amino groups; and
   B. a side chain polymer derived from a short chain polyamide represented by the formula

where Z is

$R^1$ and $R^2$ being independently selected from hydrogen, a $C_1$-$C_{18}$ alkyl, benzyl, and $C_5$-$C_6$ cycloalkyl; or taken together, being —(CH$_2$)$_4$—, —(CH$_2$)$_5$—, —(CH$_2$)$_2$—O—(CH$_2$)$_2$—, or

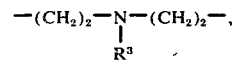

where $R^3$ is a $C_1$-$C_6$ alkyl; with the proviso that only one of $R^1$ and $R^2$ can be hydrogen;

$m$ is 5 and 11; and $x$ is a positive number having an average value of 5–60;

said side chain polymer being attached to said trunk copolymer through amide or imide linkages resulting from a reaction of the terminal primary amino group of said short chain polyamide with the amine-reactive sites of said trunk copolymer;

the proportion of said elastomeric trunk copolymer in the graft copolymer being about 45–85 weight percent.

2. A graft copolymer of claim 1 wherein $m$ is 5.
3. A graft copolymer of claim 2 wherein $R^1$ is hydrogen and $R^2$ is octadecyl.
4. A graft copolymer of claim 2 wherein $R^1$ is hydrogen and $R^2$ is octyl.
5. A graft copolymer of claim 1 wherein $m$ is 11.
6. A graft copolymer of claim 5 wherein $R^1$ is hydrogen and $R^2$ is octyl.
7. A graft copolymer of claim 1 wherein the weight proportion of the trunk polymer is about 64.5–74%.
8. A graft copolymer of claim 1 wherein the weight proportion of the trunk polymer is about 52.5–67%.
9. A graft copolymer of claim 1 wherein the trunk polymer is a copolymer of an active site monomer selected from maleic anhydride, maleic acid, fumaric acid, and monoesters of maleic or fumaric acids with alcohols having up to about 20 carbon atoms with at least one monomer selected from α-olefins; conjugated or nonconjugated dienes; styrene, and its ring-substituted derivatives; acrylic and methacrylic acids, esters, and nitriles; vinyl esters; and vinyl ethers.
10. A graft copolymer of claim 9 wherein the trunk polymer is a copolymer of ethylene, methyl acrylate, and monoethylmaleate.
11. A graft copolymer of claim 9 wherein the trunk polymer is a copolymer of ethylene, vinyl acetate and maleic anhydride.
12. A graft copolymer of claim 9 wherein the trunk polymer is a copolymer of ethylene, ethyl acrylate, allyl acrylate, and maleic anhydride.
13. A graft copolymer of claim 1 wherein the trunk polymer is an ethylene/α-olefin/diene monomer (EODM) polymer, having grafted thereon at least one of maleic anhydride and ethyl hydrogen maleate active sites.
14. A graft copolymer of claim 12 wherein the EODM polymer is an ethylene/propylene/diene monomer (EPDM) polymer.
15. A graft copolymer of claim 13 wherein the EPDM polymer is an ethylene/propylene/1,4-hexadiene polymer.

* * * * *

UNITED STATES PATENT OFFICE
CERTIFICATE OF CORRECTION

PATENT NO. : 4,017,557
DATED : April 12, 1977
INVENTOR(S) : Clarence Frederick Hammer & Harold King Sinclair It is certified that error appears in the above-identified patent and that said Letters Patent are hereby corrected as shown below:

Column 24, line 12, after "5", delete "and" and insert -- or --.

Signed and Sealed this ninth Day of August 1977

[SEAL]

Attest:

RUTH C. MASON
Attesting Officer

C. MARSHALL DANN
Commissioner of Patents and Trademarks